(No Model.)

S. R. HACKLEY.
HOSE COUPLING.

No. 310,672. Patented Jan. 13, 1885.

Witnesses,
Geo. H. Strong
J. H. Rourke

Inventor,
S. R. Hackley
By Dewey & Co.
Attorneys

UNITED STATES PATENT OFFICE.

SAMUEL R. HACKLEY, OF CROCKETT'S STATION, CALIFORNIA.

HOSE-COUPLING.

SPECIFICATION forming part of Letters Patent No. 310,672, dated January 13, 1885.

Application filed June 30, 1884. (No model.)

*To all whom it may concern:*

Be it known that I, SAMUEL R. HACKLEY, of Crockett's Station, county of Contra Costa, and State of California, have invented an Improvement in Hose-Couplings; and I do hereby declare the following to be a full, clear, and exact description thereof.

My invention relates to a new and useful hose-coupling; and it consists in a tapering male coupling, a corresponding tapering female coupling, spring latches or dogs in the latter, an annular groove on the former, with which the dogs engage, a packing-ring on the male coupling, and abutting shoulders on each, all of which I shall hereinafter fully explain.

The object of my invention is to provide a simple, effective, and readily-operated hose-coupling.

Figure 2:
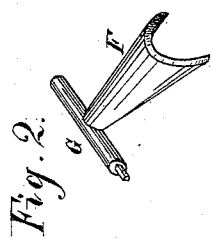
Figure 3:
Figure 1:
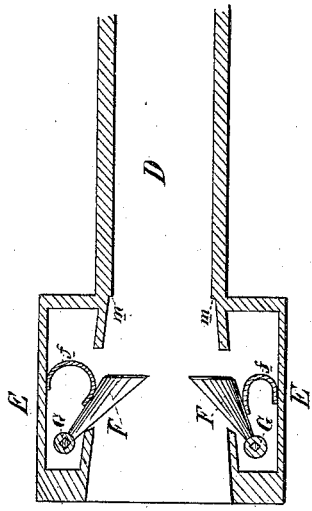
Figure 1:
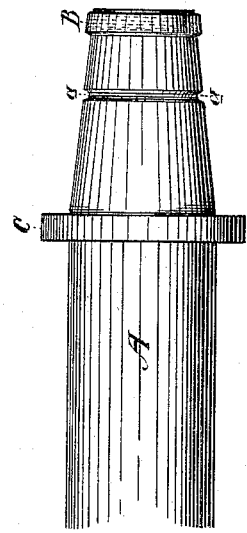

Referring to the accompanying drawings, Figure 1 is a view of the coupling separated, the male coupling being in elevation and the female coupling in section. Fig. 2 is a perspective view of one of the dogs F. Fig. 3 is a perspective view of the key K.

A is the male coupling, consisting of a piece of pipe formed tapering, as shown. Near the end of the pipe is an elastic packing ring or washer, B, and farther back is a groove, *a*, made all the way around the pipe.

C is a collar on said pipe.

D is the female coupling or pipe, the entrance to which is flaring or tapers backwardly to receive the male coupling.

Upon the end of coupling D is formed or secured a chambered collar, E, in which are pivoted the dogs F, the inner ends of which play inwardly through openings in the coupling. They are influenced by springs *f*. Their pivots are short shafts G, one of each of which is squared and projects to the outside of the collar, and is adapted to receive the key K. (Shown in Fig. 3.) These dogs widen toward their inner ends, and are curved, as shown, to the curvature of the groove *a*, with which they engage, Fig. 2. The entrance of the female coupling terminates in a shoulder, *m*, formed on the inner surface. When the male coupling is adjusted, its end abuts against shoulder *m*, and its collar C abuts against the end of the female coupling, thus forming two joints, the parts of which are accurately fitted by grinding. Upon entering, the spring-dogs are forced outwardly by the male coupling as it passes until the groove *a* reaches them, when they drop into and engage with said groove. The packing-ring B bears against the inner surface of the female coupling, and thus renders it water-tight. The engagement of the dogs with the groove prevents any line movement or separation of the couplings; but it also allows for the swivel or rotation of the parts, so that one coupling may readily be turned on the other. By having the groove pass completely around the male coupling the latter may enter in any position, and needs no previous adjustment.

To uncouple, a key, K, is fitted to the square end of each of the pivot-shafts G, whereby they may be turned to lift their dogs out of engagement with the groove.

The coupling is simple, can be made at small cost, is readily operated, and is effective.

Having thus described my invention, what I claim as new, and desire to secure by Letters Patent, is—

1. A hose-coupling consisting of the male coupling A, having an annular groove, *a*, and the female coupling D, having the pivoted and curved spring-dogs F, adapted to engage with the groove *a* of the male coupling, substantially as herein described.

2. A hose-coupling consisting of the tapering male coupling A, having an annular groove, *a*, and the correspondingly-tapering female coupling D, having the pivoted and curved spring-dogs F, adapted to engage with the groove *a* of the male coupling, substantially as herein described.

3. A hose-coupling consisting of the tapering male coupling A, having an annular groove, *a*, and a packing ring or washer, B, and the correspondingly-tapering female coupling D, having the pivoted and curved spring-dogs F, adapted to engage with the groove *a* of the male coupling, substantially as herein described.

4. A hose-coupling consisting of the tapering male coupling A, having the annular groove *a* and a packing ring or washer, B, and the correspondingly-tapering female coupling D, having the chambered collar E, the wide-ended curved dogs F, pivoted in said collar, and the springs *f*, by which said dogs are forced into their engagement with the groove $a$, substantially as herein described.

5. A hose-coupling consisting of the tapering male coupling A, having the annular groove $a$ and the packing ring or washer B, and the correspondingly-tapering female coupling D, having the chambered collar E, the wide-ended curved dogs F, the short pivot-shafts G, with an end projecting to the outside, and adapted to receive a key, and the springs $f$, by which said dogs are forced in to their engagement with the groove $a$, substantially as herein described.

6. A hose-coupling consisting of the tapering male coupling A, having packing-ring B and groove $a$, and the corresponding tapering female coupling D, having the spring-dogs F and the shoulder $m$, against which the end of the male coupling abuts, substantially as herein described.

7. A hose-coupling consisting of the tapering male coupling A, having packing-ring B, groove $a$, and collar C, abutting against the end of the female coupling, and the correspondingly-tapering female coupling D, having the spring-dogs F, substantially as herein described.

8. A hose-coupling comprising the tapering pipe A, with its packing-ring B, groove $a$, and collar C, and the corresponding tapering pipe D, with its shoulder $m$, its chambered collar E, and spring-dogs F, adapted to swing by means of the pivot-shafts G, operated from the outside, all arranged and adapted to fit together substantially as herein described.

In witness whereof I have hereunto set my hand.

SAMUEL R. HACKLEY.

Witnesses:
JONATHAN EDMONDSON,
HOWARD T. MARSH.